United States Patent [19]

Traffenstedt et al.

[11] Patent Number: 5,837,206

[45] Date of Patent: Nov. 17, 1998

[54] INTEGRAL MANIFOLD FOR A SINGLET DELTA OXYGEN GENERATOR

[75] Inventors: Michael W. Traffenstedt, Moorpark; Alan Z. Ullman, Northridge, both of Calif.

[73] Assignee: Boeing North American, Inc., Seal Beach, Calif.

[21] Appl. No.: 707,549

[22] Filed: Sep. 4, 1996

[51] Int. Cl.⁶ .................................. H01S 3/00; A62B 7/08
[52] U.S. Cl. .......................... 422/120; 422/123; 372/55; 423/579
[58] Field of Search ................................ 422/129, 188, 422/211, 236, 292, 120, 123; 423/579; 327/89, 55, 58, 62

[56] References Cited

U.S. PATENT DOCUMENTS 4,227,900  10/1980  Nichols et al. ............................ 55/288
4,668,498  5/1987  Davis ....................................... 423/579

*Primary Examiner*—Lorraine Spector
*Assistant Examiner*—Michael Pak
*Attorney, Agent, or Firm*—Steven E. Kahm; Lawrence N. Ginsberg; Harry B. Field

[57] ABSTRACT

A V-shaped singlet delta oxygen manifold for a chemical iodine oxygen laser wherein singlet delta oxygen is produced in one or more reaction zones and enters the interior of the V-shaped manifold. The V-shape of the integral manifold causes the singlet delta oxygen containing gas to undergo rapid change in flow area and a consequent rapid increase in velocity. The integral manifold also directs the singlet delta oxygen entering the V-shaped manifold to the open end of the V which is connected to a nozzle for injecting singlet delta oxygen into a laser cavity for providing energy to a laser beam. The V-shape enables a uniform pressure along its arms for introducing the singlet delta oxygen to the inside of the singlet delta oxygen manifold and directs the flow of the singlet delta oxygen to the nozzle.

10 Claims, 4 Drawing Sheets

INTEGRAL MANIFOLD FOR A SINGLET DELTA OXYGEN GENERATOR

BACKGROUND OF THE INVENTION

1. Field of the Invention

This invention relates to singlet delta oxygen generators and more particularly to a singlet delta oxygen generator manifold having a contour which allows a rapid transition to occur between the flow conditions in the singlet delta oxygen generator and the flow conditions prevailing downstream of the singlet delta oxygen generator and which provides a uniform high velocity in the manifold as additional flow enters the manifold.

2. Description of the Related Art

Generators for producing singlet delta oxygen in chemical oxygen iodine lasers have used gaseous chlorine, with or without diluents including helium, nitrogen, and argon, in contact with basic hydrogen peroxide, in the forms including liquid pools, films, droplets, and jets. Due to disparities between the generally low gas velocities at which satisfactory reaction conditions may be created between the chlorine and basic hydrogen peroxide, and the much higher gas velocities needed to preserve the singlet delta oxygen and to create the flow conditions favored for laser beam generation in the chemical oxygen iodine laser, transition sections are typically used to merge flows from multiple reaction zones, to accelerate that gaseous flow, and to match the flow conditions between the singlet delta oxygen generator or generators and the downstream portions of the chemical oxygen iodine laser. The transition section introduces additional length and results in additional losses of singlet delta oxygen by reaction in the transition section volume. The transition section flow conditions steadily change from the low velocity at the reaction zone to the high velocity of the beam generation zone.

SUMMARY OF THE INVENTION

The integral manifold is connected to one or more singlet delta oxygen generators which have chlorine or a chlorine-bearing gas mixture moving across or through basic hydrogen peroxide (BHP) in one or more reaction zones. This gas flow enters the integral manifold as subdivided flows which individually turn into the contoured integral manifold. This manifold is so contoured and oriented that the gas, on turning into the manifold in a controlled manner, accelerates over a small distance. The angle through which the gas turns and the contour of the integral manifold is related to the desired change in flow velocity and is such as to provide a compact flow path with a uniformly high velocity downstream of the singlet delta reaction zone or zones for each of the subdivided flows. The contour of the integral manifold is arranged to accommodate the merged flow of singlet delta oxygen from the reaction zones into the manifold while the velocity and pressure of the gas in the manifold is maintained constant or at prescribed levels as dictated by the particular application.

OBJECTS OF THE INVENTION

It is an object of the invention to provide a compact means for delivering singlet delta oxygen from a singlet delta oxygen generator to the downstream portions of a chemical oxygen iodine laser including the laser cavity.

It is an object of the invention to provide a means for minimizing the volume and the reaction losses of singlet delta oxygen in the region downstream of the singlet delta oxygen generator or generators.

It is also an object of this invention to provide a means for combining the flows from a multiplicity of reaction zones each producing singlet delta oxygen to a single flow in which the chemical oxygen iodine laser processes occur.

It is a further object of this invention to provide a means for maintaining identical conditions or nearly identical conditions in each of the singlet delta oxygen reaction zones by means of controlling the flow conditions, velocities, and pressures within the integral manifold.

Other objects, advantages and novel features of the present invention will become apparent from the following detailed description of the invention when considered in conjunction with the accompanying drawing.

DETAILED DESCRIPTION OF THE PREFERRED EMBODIMENT

Figure 1:
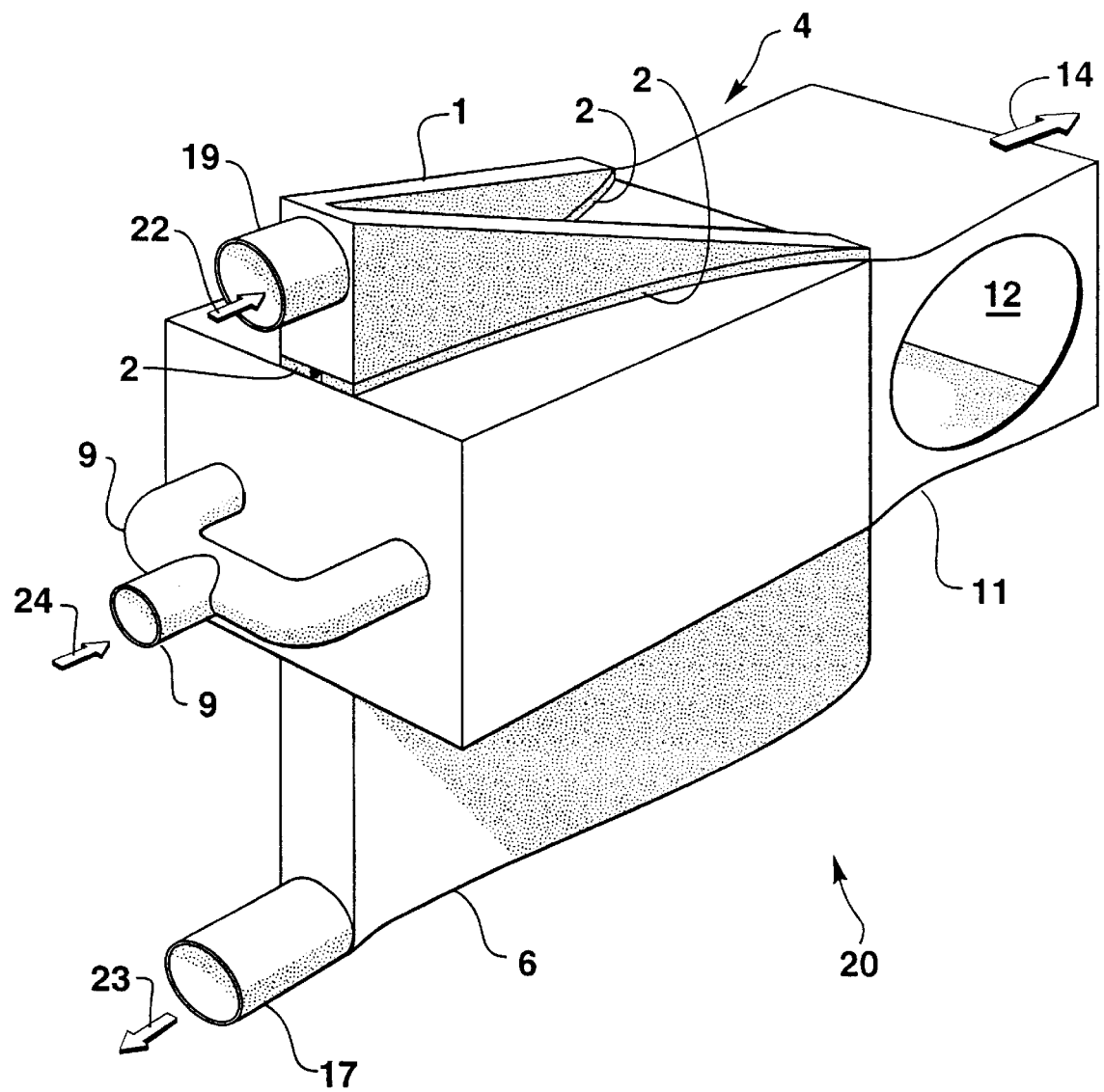
FIG. 1 is an isometric view of the V-shaped singlet delta oxygen generator.
Figure 2:
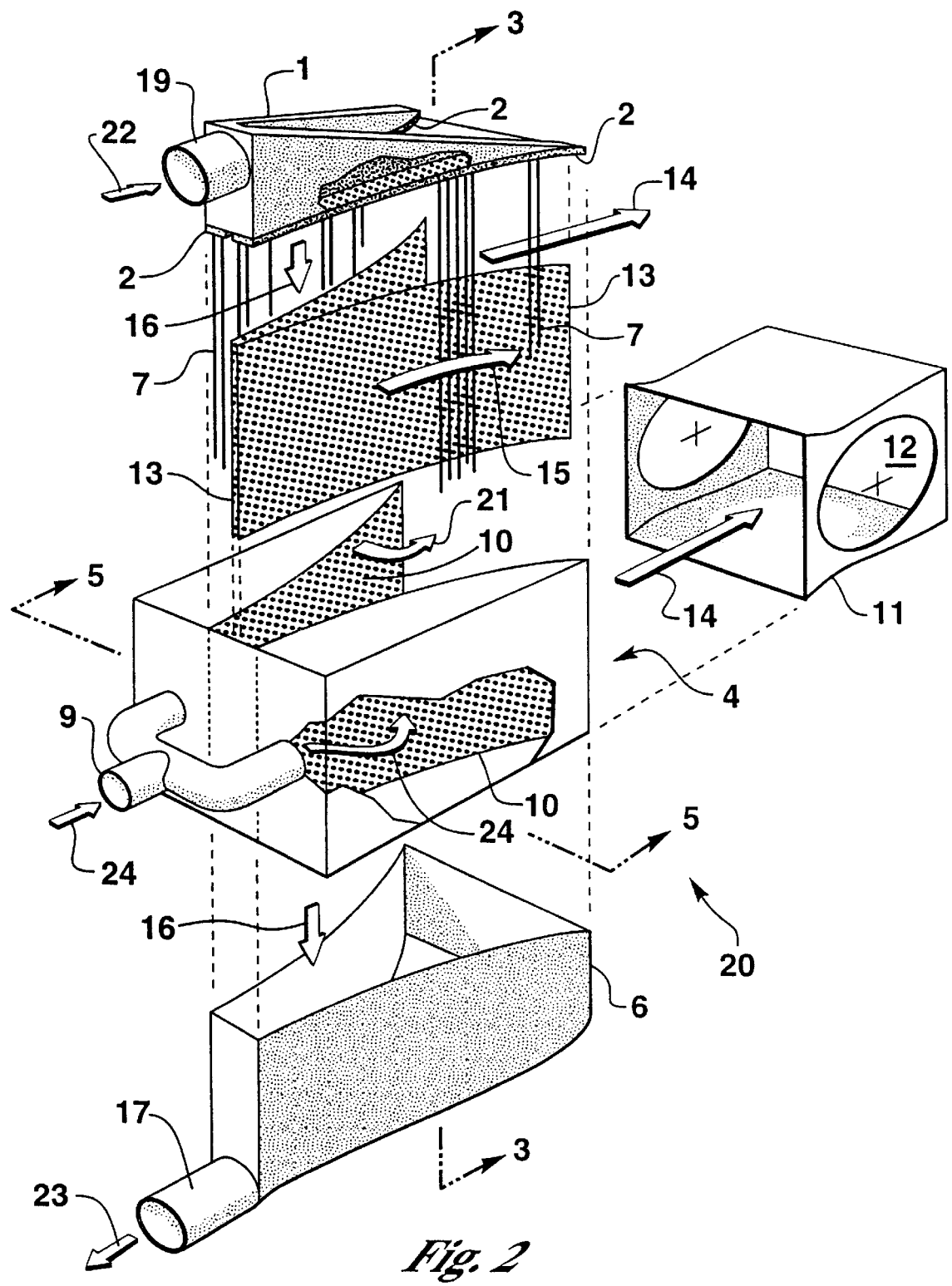
FIG. 2 is an exploded isometric view of the V-shaped singlet delta oxygen generator.

Referring to FIGS. 1 and 2, the V-shaped integral manifold singlet delta oxygen generator, is shown generally as 20. A basic hydrogen peroxide (BHP) flow 22, enters the device at inlet 19 and flows through the BHP inlet manifold 1, under pressure, to BHP orifice plate 2. The BHP passes though holes in the BHP orifice plate 2, which creates BHP jets 7, directed downward as shown by BHP flow 16.

Figure 3:
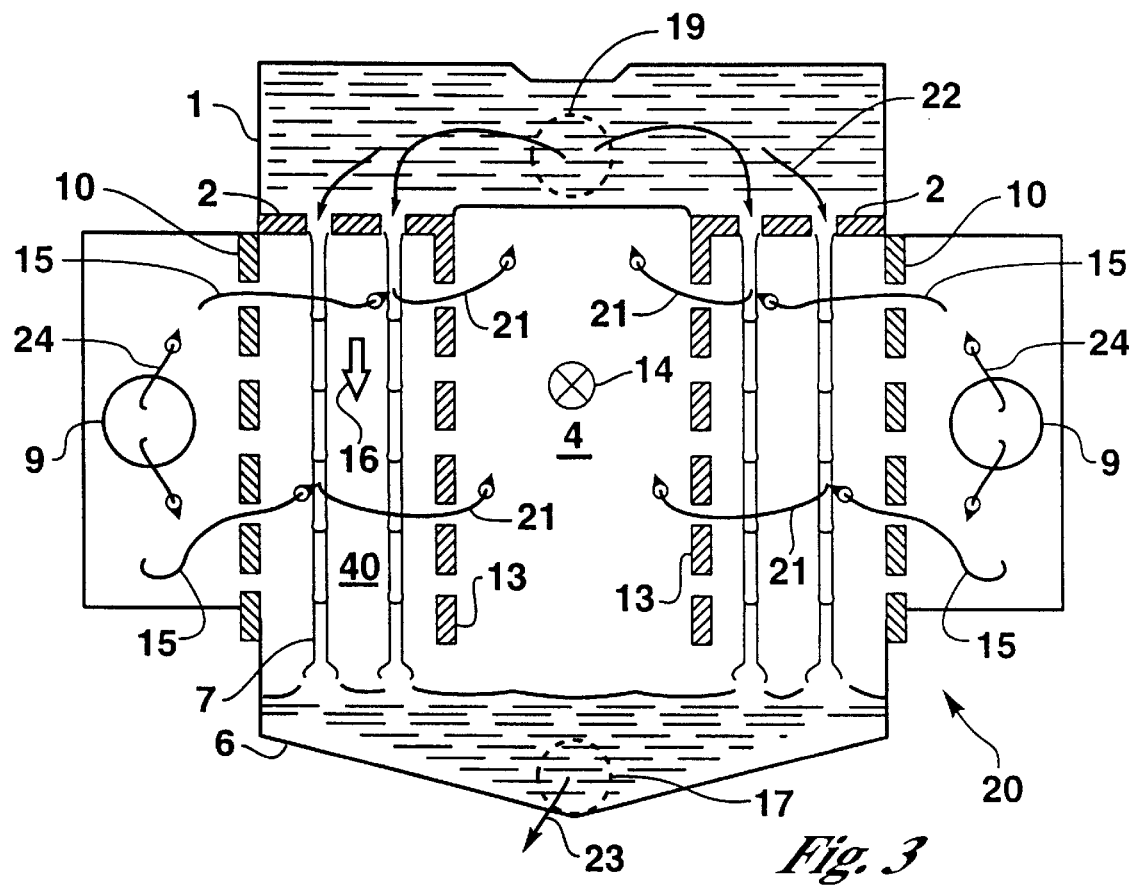
FIG. 3 is a cross section of a manifold in the singlet delta oxygen generator taken along line 3—3 of FIG. 2.

The integral manifold singlet delta oxygen generator 20 has chlorine-helium mixture inlets 9 for providing a chlorine-helium mixture flow 24, to orifice plate 10. The chlorine-helium mixture flow 24, emanating from orifice plate 10, is perpendicular to the BHP jets 7 flowing from BHP orifice plate 2 as best seen in FIG. 3. The chemical interaction between the $Cl_2$ and BHP yields singlet delta oxygen $O_2$ ($^1\Delta$) and spent BHP. The spent BHP and BHP not reacted with the chlorine flows downward as shown by BHP flow 16 to BHP collector manifold 6 at the bottom of the V-shaped integral manifold singlet delta oxygen generator 20. The spent BHP and BHP mixture flows out of BHP outlet 17, as flow 23, to be further used in the system. The singlet delta oxygen $O_2$ ($^1\Delta$) created by the reaction flows through a pressure distribution plate 13, into the integral singlet delta oxygen manifold 4, on the inside of the V-shaped integral manifold singlet oxygen generator 20.

Use of the V-shaped manifold allows the chlorine-helium mixture 24, to flow across the BHP jets 7, at conditions promoting mixing, reducing carryover and allowing a higher power output in less volume. The distribution plate 13 forms the entrance of the integral manifold and is contoured to provide a uniform pressure along the length of both arms of the manifold. The uniform pressure produces uniform reaction conditions between the chlorine-helium mixture 24 and BHP jets 7 in reaction zone 40 and prevents longitudinal flow of the gas within the reaction zone.

The $O_2$ ($^1\Delta$) bearing mixture 21 is turned and rapidly accelerated on passing through the distribution plate 13 and into the singlet delta oxygen duct 4. It then flows under pressure and at high velocity to nozzle 11 which feeds the $O_2$ ($^1\Delta$) to laser cavity 12.

The chlorine-helium mixture flow path which translates to a singlet delta oxygen $O_2$ ($^1\Delta$) flow path is shown by interaction flow path 21. The path starts out as a flow of a chlorine-helium mixture perpendicular to the BHP manifold 1, and is turned after the chemical reaction inside of the V-shaped manifold to flow the $O_2$ ($^1\Delta$) in flow path 14, perpendicularly toward nozzle 11.

The orientation of the integral singlet delta oxygen manifold 4 with respect to the chlorine/BHP reaction zone 40, defined by the intersection of the BHP flow 7 and the chlorine-helium mixture flow 21, and the laser cavity 11 is such as to provide for a rapid acceleration of each portion of the singlet delta oxygen containing gas mixture 21 on passage through the distribution plate 13. This is achieved by turning the gas mixture flow 21 through an angle which reduces the flow area provided for the gas mixture flow 21 and therefore achieves the desired flow acceleration. Since each portion of the chlorine/BHP reaction zone 40 can be so handled independent of all other portions within this zone, the length required to effect this specific turn can be made extremely small. In this manner all of the singlet delta oxygen-containing flow 21 can be accelerated rapidly and uniformly without consideration of the overall length of the chlorine/BHP reaction zone 40.

The outer boundary of the integral singlet delta oxygen manifold 4, defined by the distribution plate 13, is specifically contoured so as to provide constant or nearly constant pressure so that all portions of the chlorine/BHP reaction zone 40 operate at identical conditions. This can be achieved while accommodating the heat release which occurs in the integral singlet delta oxygen manifold 4 due to various reactions of the singlet delta oxygen and other species contained in the singlet delta oxygen bearing stream 21 by appropriate selection of the contour such as to achieve a controlled velocity profile of the singlet delta-containing flow 21.

The flow of the $O_2$ ($^1\Delta$) to the laser cavity 12 is at high velocity such that the flow times from the chemical reaction creating the $O_2$ ($^1\Delta$) to the laser cavity are short, thereby preserving the high energy state of the $O_2$ ($^1\Delta$) used in the laser cavity 12.

Figure 5:
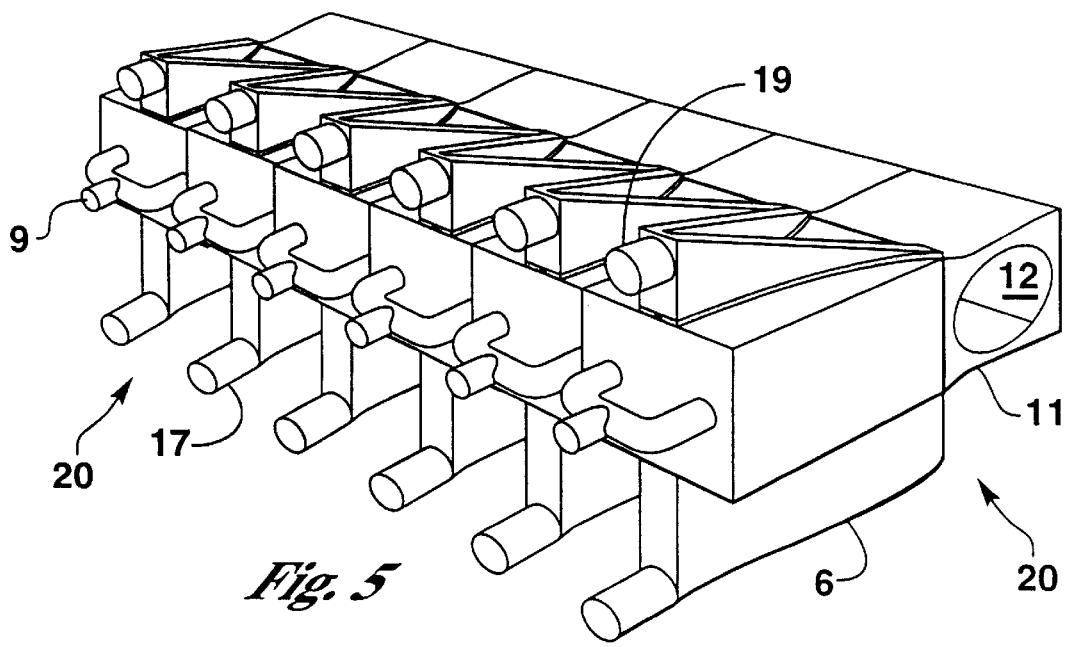
FIG. 5 is an array of the singlet delta oxygen generators connected together.

As shown in FIG. 5, the V-shaped integral manifold singlet delta oxygen generators 20, can be assembled in arrays to provide the laser with a more powerful beam by providing a larger amount Of $O_2$ ($^1\Delta$) in a longer laser cavity 12.

Figure 4:
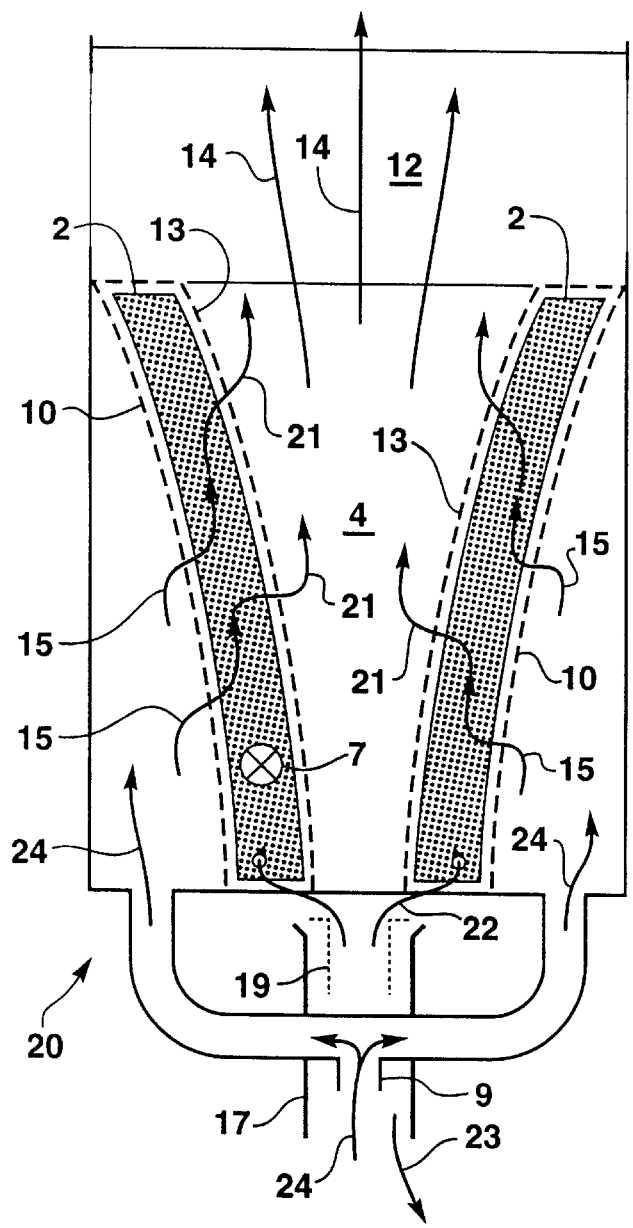
FIG. 4 is a top view of the V-shaped singlet delta oxygen generator taken along line 5—5 of FIG. 2.
Figure 6:
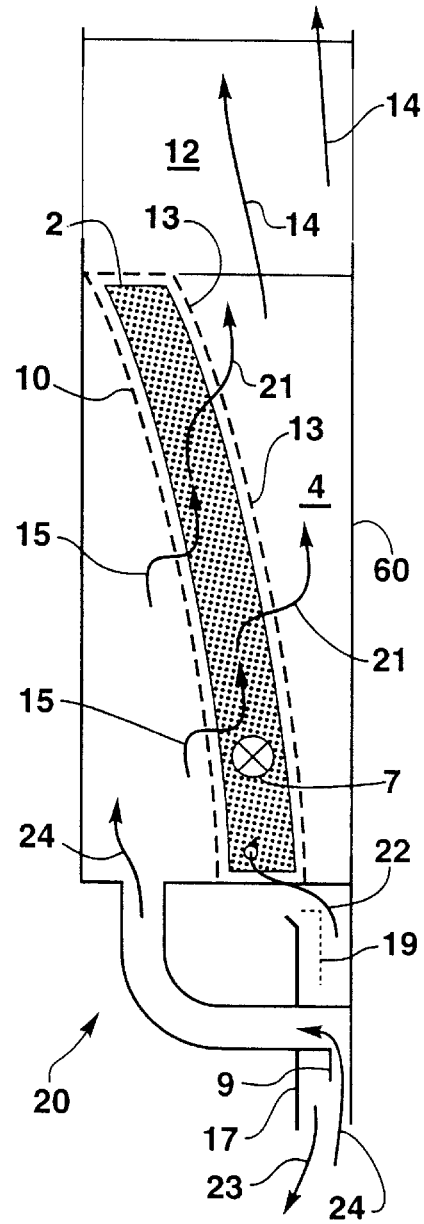
FIG. 6 is a top view of the V-shaped singlet delta oxygen generator with a wall as one arm.

Alternatively as shown in FIG. 6 a wall 60 can be used as an arm of the V-shaped integral manifold. The wall 60 is a solid barrier to the flow Of $O_2$ ($^1\Delta$) The wall 60 can be thought of as dividing the V-shaped singlet delta oxygen generator of FIG. 4 in half. It is easy to see from FIG. 4 that the $O_2$ ($^1\Delta$) flow 21 should turn to flow path 14 and be straight toward the exit in the center of the singlet delta oxygen manifold 4 the flow going parallel to the wall 60.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A V-shaped integral manifold comprising:

a V-shaped singlet delta oxygen duct bounded by a distribution plate and a straight wall forming arms of the V-shaped singlet delta-oxygen generator, the V-shaped singlet delta oxygen duct having a top and a bottom, an open end and a closed end, wherein singlet delta oxygen enters the V-shaped singlet delta oxygen duct as a plurality of subdivided flows through said distribution plate, said flows being simultaneously turned and accelerated toward the open end of the V-shaped singlet delta oxygen duct and combined at the open end thereby compacting the flow cross-section and achieving a rapid increase in velocity.

2. A V-shaped integral manifold as in claim 1 wherein:

the distribution plates are contoured for constant pressure along the arms of the V-shaped singlet delta oxygen duct.

3. A V-shaped integral manifold as in claim 1 wherein:

the distribution plate is contoured for constant velocity of the singlet delta oxygen along the arms of the V-shaped singlet delta oxygen duct.

4. A V-shaped integral manifold comprising:

a V-shaped singlet delta oxygen duct bounded by a first distribution plate and a second distribution plate forming arms of the V-shaped singlet delta oxygen generator, the V-shaped singlet delta oxygen duct having a top and a bottom, an open end and a closed end, wherein singlet delta oxygen enters the V-shaped singlet delta oxygen duct as a plurality of subdivided flows through said distribution plates, said flows being simultaneously turned and accelerated toward the open end of the V-shaped singlet delta oxygen duct and combined at the open end thereby compacting the flow cross-section and achieving a rapid increase in velocity.

5. A V-shaped integral manifold as in claim 4 wherein:

the distribution plates are contoured for constant pressure along the arms of the V-shaped singlet delta oxygen duct.

6. A V-shaped integral manifold as in claim 4 wherein:

the distribution plates are contoured for constant velocity of the singlet delta oxygen along the arms of the V-shaped singlet delta oxygen duct.

7. A V-shaped integral manifold for a singlet delta oxygen generator comprising:

a V-shaped reaction zone having, a top, a bottom, an inside surface, and an outside surface, for reacting chlorine with basic hydrogen peroxide therein to form singlet delta oxygen, the V-shaped reaction zone having a basic hydrogen peroxide orifice plate at the top of the reaction zone for injecting jets of basic hydrogen peroxide into the reaction zone, a second orifice plate perpendicular to the basic hydrogen peroxide orifice plate, at the outside surface of the reaction zone for injecting a chlorine containing fluid into the reaction zone perpendicular to the basic hydrogen peroxide jets, and a distribution plate parallel to the second orifice plate at the inside surface of the reaction zone for discharging singlet delta oxygen from the reaction zone, a manifold for supplying chlorine to the orifice plate, a manifold for supplying basic hydrogen peroxide to the basic hydrogen peroxide orifice plate, a V-shaped integral singlet delta oxygen manifold bounded by the distribution plate, the reaction zone being adjacent to the distribution plate, the manifold having an open end and a closed end, such that the singlet delta oxygen turns after passing through the distribution plate and accelerates to the open end.

8. A V-shaped integral manifold for a singlet delta oxygen generator as in claim 7 wherein;

a nozzle is attached to the open end of the V-shaped singlet delta oxygen manifold for receiving the singlet delta oxygen a laser cavity is attached to the nozzle for receiving the singlet delta oxygen from the nozzle.

9. A V-shaped integral manifold for a singlet delta oxygen generator as in claim 7 wherein;

the basic hydrogen peroxide orifice plate is straight such that the reaction zone has straight sides.

10. A V-shaped integral manifold for a singlet delta oxygen generator as in claim 7 wherein;

the basic hydrogen peroxide orifice plate is curved such that the reaction zone has curved sides.

* * * * *